(12) United States Patent
Cunningham et al.

(10) Patent No.: US 10,191,458 B2
(45) Date of Patent: Jan. 29, 2019

(54) APPARATUS AND METHOD FOR INTERFACING A PLURALITY OF REMOTE DEVICES TO A PROGRAMMABLE LOGIC CONTROLLER (PLC)

(71) Applicant: 3-CI Partnership, Calgary (CA)

(72) Inventors: Steven Paul Cunningham, Calgary (CA); Logan S. Gunthorpe, Calgary (CA)

(73) Assignee: 3-CI Partnership, Calgary (CA)

( * ) Notice: Subject to any disclaimer, the term of this patent is extended or adjusted under 35 U.S.C. 154(b) by 471 days.

(21) Appl. No.: 15/045,170

(22) Filed: Feb. 16, 2016

(65) Prior Publication Data

US 2016/0239007 A1  Aug. 18, 2016

(30) Foreign Application Priority Data

Feb. 17, 2015 (CA) ................... 2882305

(51) Int. Cl.
*G05B 19/042* (2006.01)

(52) U.S. Cl.
CPC .. *G05B 19/042* (2013.01); *G05B 2219/15006* (2013.01); *G05B 2219/24215* (2013.01); *G05B 2219/33342* (2013.01)

(58) Field of Classification Search
CPC .......... G05B 2219/24215; G05B 2219/15006; G05B 2219/33342; G05B 19/02–19/058
USPC ........................................................... 700/9
See application file for complete search history.

(56) References Cited

U.S. PATENT DOCUMENTS

| 8,117,434 B2 * | 2/2012 | Sun ................. G06F 11/1417 709/220 |
| 2010/0186400 A1 * | 7/2010 | Preston ................. F03G 7/10 60/325 |

\* cited by examiner

*Primary Examiner* — Gene Auduong
(74) *Attorney, Agent, or Firm* — ATMAC Patent Services Ltd.; Andrew T. MacMillan

(57) ABSTRACT

A configurable, connectorized system for providing RTU monitoring of field digital and analog parameters and transmitting data to the Central PLC system dramatically reduces the number of wire connections that must be made to connect sensors and actuators to a PLC system. The system is also extremely rugged and safe to be located in a hazardous environment.

20 Claims, 10 Drawing Sheets

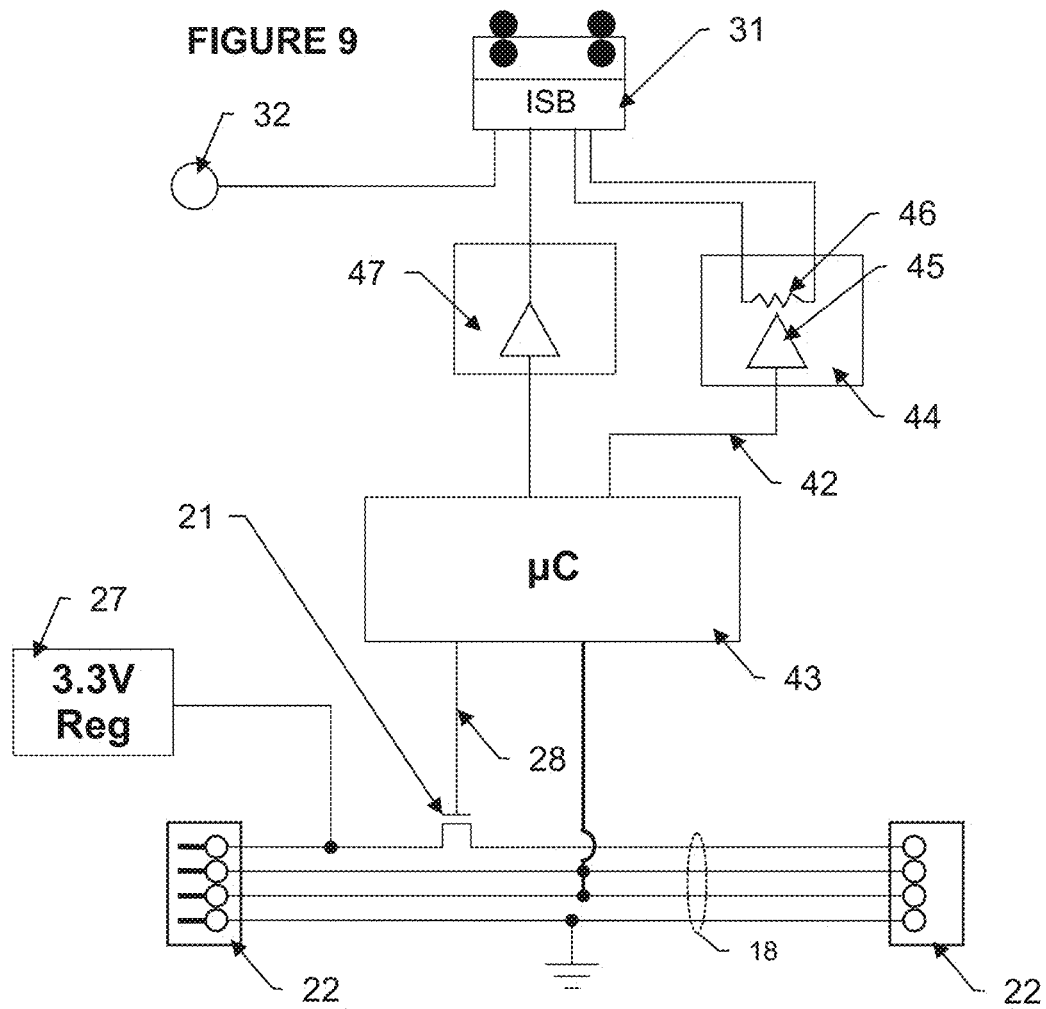

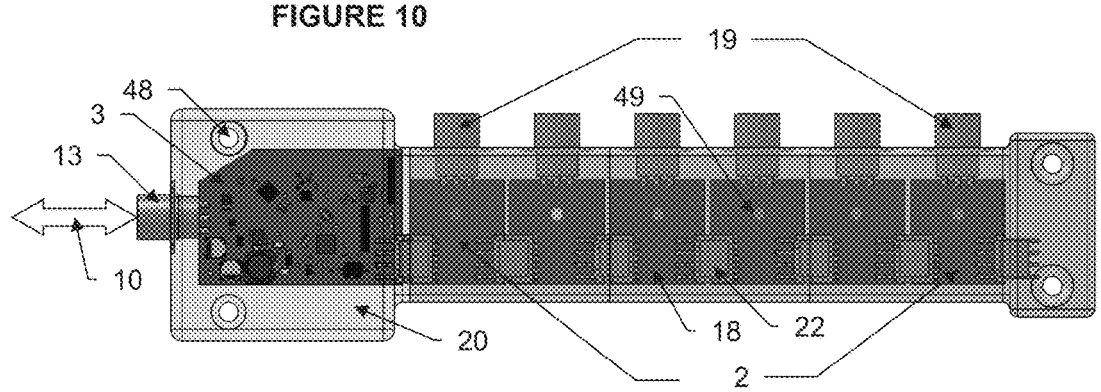

APPARATUS AND METHOD FOR INTERFACING A PLURALITY OF REMOTE DEVICES TO A PROGRAMMABLE LOGIC CONTROLLER (PLC)

CROSS-REFERENCE TO RELATED APPLICATIONS

This application claims the benefit of priority of Canadian Patent Application No. 2,882,305 filed Feb. 17, 2015, which is incorporated herein by reference.

BACKGROUND OF THE INVENTION (1) Field of the Invention

The present invention relates to the field of supervisory control and data acquisition (SCADA) systems. More particularly, the present invention relates to SCADA systems in which signals from end devices such as sensors and control devices are transmitted to and from a remote location via a standard Modbus or other protocol.

(2) Description of the Related Art

The control of various systems such as may be associated with a vehicle or other complex systems must take in various electronic signals and process those signals to control associated components. These controls are becoming more and more complex. One type of control element is an input/output module. An input/output module receives an "Input" signal, such as from a switch or sensor, respectively a digital or an analog signal. The signal from a sensor might be that a particular condition has been sensed, and some control step should now be taken. The input from a switch may be that the switch has switched from off to on, and some control action must be taken. The "output" of the module is typically sending a signal to control an associated component based upon the signal from the switch or sensor or from a microcontroller. In the past, there has been a plurality of these modules associated with more complex systems. Typically, a single processor (PLC) has been associated with and directly and locally connected to a plurality of input/output modules located in the PLC. This has been somewhat undesirable in that a failure of that single processor would cause all of those control systems to fail.

SCADA systems perform adjustments by modifying set points and other parameters in the processor (PLC) by communicating principally via a network connection, With the network connection generally inside of a Local Area Network (LAN) where communication timing, security and reliability is maintained. The PLC itself is made up of input/output modules (I/O modules) which connect to the sensors producing the information about the state of the process, and the actuators, which provide the action of the control system.

The prior art utilizes fixed-configuration I/O modules local to the host processor (ie. part of the PLC). Due to cost, complexity and non-rugged nature of PLC's, generally, few are used and cover large geographical regions. This requires many long cables to be run from each sensor to the PLC. Sensors are generally clustered together and thus some rugged low cost means is required to substantially reduce the length and number of cables.

Further the National Electrical Code mandates that Wiring and devices used in a hazardous environment be intrinsically safe in that they are incapable of releasing electrical or thermal energy to cause ignition of a volatile gas or gaseous mixture. In general, an intrinsically safe environment has a safe side and a hazardous side. In an intrinsically safe application, it is a common practice to use an intrinsically safe barrier as a safety buffer between a device located on the hazardous side and an apparatus located on the safe side. The prior art therefor requires the addition of Intrinsic Barriers to each input/output signal.

BRIEF SUMMARY OF THE INVENTION

It is an object of the present invention to provide a method and apparatus that reduces the cable complexity involved in making interconnections in control systems. It is another object of the present invention to provide a configurable input/output module for directing signals between apparatus through standard cables. In further features of this invention, a plurality of the modules are provided with a common power supply. Also, a plurality of the modules report over common communication lines to a central controller which in turn reports to a PLC or other SCADA device over a standard bus use a standard protocol, preferably Multibus. A further object of the present invention to provide a method and apparatus that can be configured then completely encapsulated in Poly-Urethane. A further object of the present invention to provide a method and apparatus that is intrinsically safe.

These and other advantages and embodiments of the present invention will no doubt become apparent to those of ordinary skill in the art after reading the following detailed description of the preferred embodiment that is illustrated in the various figures and drawings.

BRIEF DESCRIPTION OF THE DRAWINGS

The invention will be described in greater detail with reference to the accompanying drawings which represent preferred embodiments thereof:

FIG. 9 is a diagram of an analog output type input/output circuit 2.

FIG. 10 is a shadow view of the rugged remote input/output module 1.

DETAILED DESCRIPTION

Figure 1:
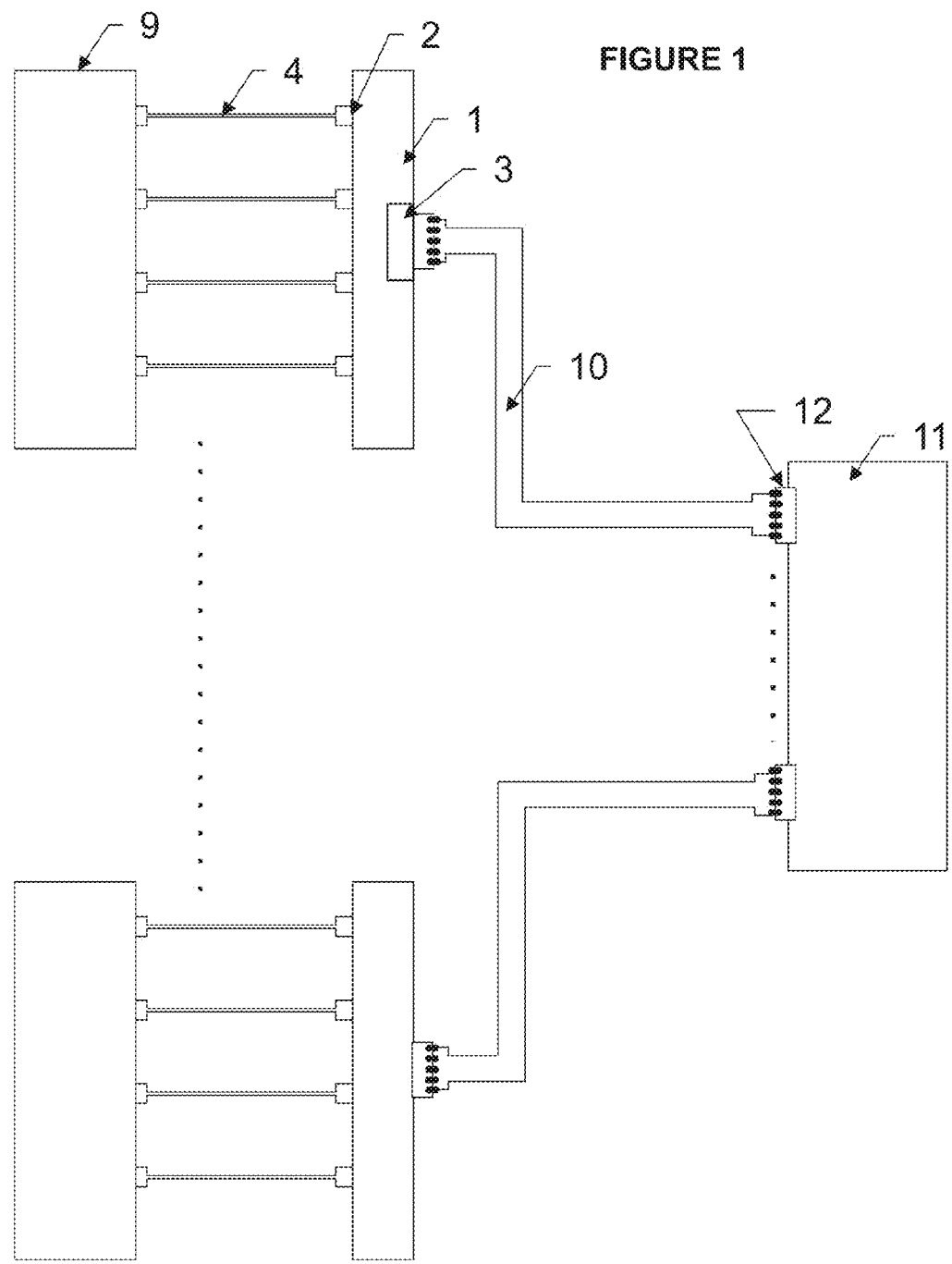
FIG. 1 is a diagram of a modular SCADA system according to an embodiment of the present invention.

Referring now to FIG. 1 of the drawings, a block diagram is presented for illustration of the method and apparatus of a preferred embodiment of the present invention as part of an overall SCADA system. The apparatus of the present invention includes a universal input/output module 1 including a plurality of input/output circuits 2 and a central controller 3. Various sensors and control devices 9 are typically connected to input/output circuits 2 via a plurality of short cables 4. The central controller 3 is connected via a single cable 10 to a compatible bus input module 12 which is internal to a PLC or other SADC programmable controller 11. A plurality of the above systems can be located in multiple locations and connected to the same PCL 11.

Figure 2:
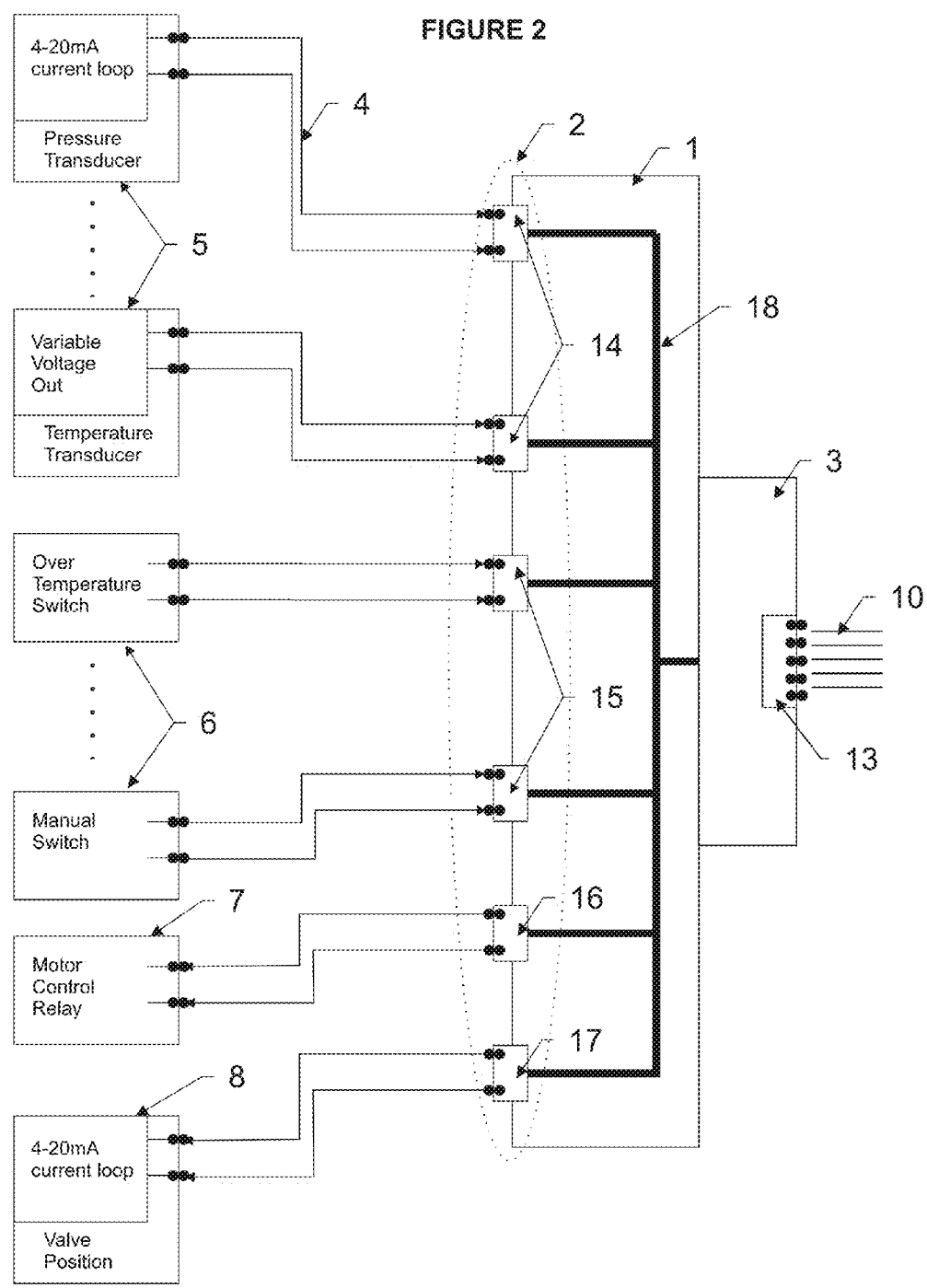
FIG. 2 is a diagram of a rugged remote input/output system with the sensors, cabling and universal input/output system according to an embodiment of the present invention.

Referring now to FIG. 2 of the drawings, a block diagram is presented for illustration of the method and apparatus of a preferred embodiment of the present invention connected to typical representative set of local sensors and control devices. The apparatus of the present invention is a rugged remote input/output module 1 including a plurality of input/output circuits 2 and a central controller 3. A plurality of typical analog sensors 5 is shown connected to analog input circuits 14. A plurality of typical switch closure devices 6 is shown connected to switch closure input circuits 15. A motor control relay device 7 is shown connected to a switch output circuit 16. An analog control device 8 is shown connected to an analog output circuit 17. The plurality of input/output circuits 2 can be configured as required at time of manufacture. The plurality of input/output circuits 2 are connected via an internal bus 18 to a central controller 3. The central controller 3 includes a connecter 13 allowing connection to standard bus 10 which in turn allows communication to and from a PCL. Said bus maybe an RS485 or Ethernet bus over which Modbus or other standard commands can be sent and received. Other standard bus types such as but not limited to CAN bus can be supported.

Figure 3:
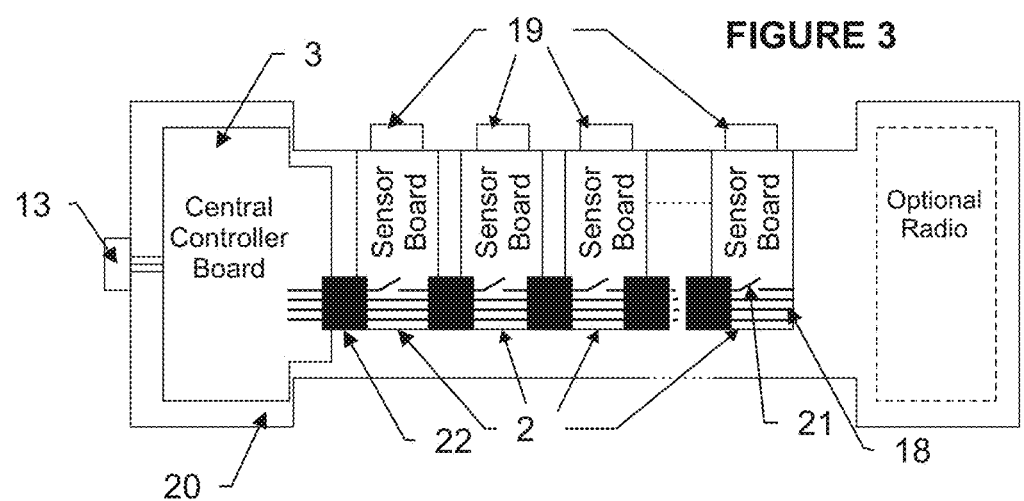
FIG. 3 is a diagram of a rugged remote input/output module 1.

Referring now to FIG. 3 of the drawings, a block diagram is presented for illustration of the method and apparatus of a preferred embodiment of the universal input/output module 1 including a plurality of input/output circuits 2 and a central controller 3. A plurality of rugged connectors 19 allows connection of remote sensors to the input/output circuits 2. The plurality of input/output circuits 2 are connected via connector 22 to an internal bus 18 then to a central controller 3. The internal bus 18 consists of two signal and one ground line. The fourth line, power, is daisy chained through switch 21 on each input/output circuit 2. Each switch 21 turns the power onto the next input/output circuit 2. This system provides automatic addressing for the input/output circuit 2. When the system is initialized all input/output circuits 2 will have their switches 21 turned off so that only one input/output circuit 2 has power to start. The central controller 3 will then send a set address command and which will cause that input/output circuit 2 set its address and to turn on the power for the next input/output circuit 2. These steps are repeated until all of the input/output circuit 2 addresses are set. This way addresses can be automatically assigned starting from the input/output circuit 2 nearest the central controller 3. The central controller 3 can now send commands and receive data from each input/output circuit 2 individually. The overall universal input/output module 1 is encapsulated in a solid block of poly-urethane 20. A connection to raw power (8-28 VDC) 32 is available to power any sensors that require it. A possible option radio 22 is shown for reference as the data and commands may be sent/received via radio rather than the bus.

Figure 4:
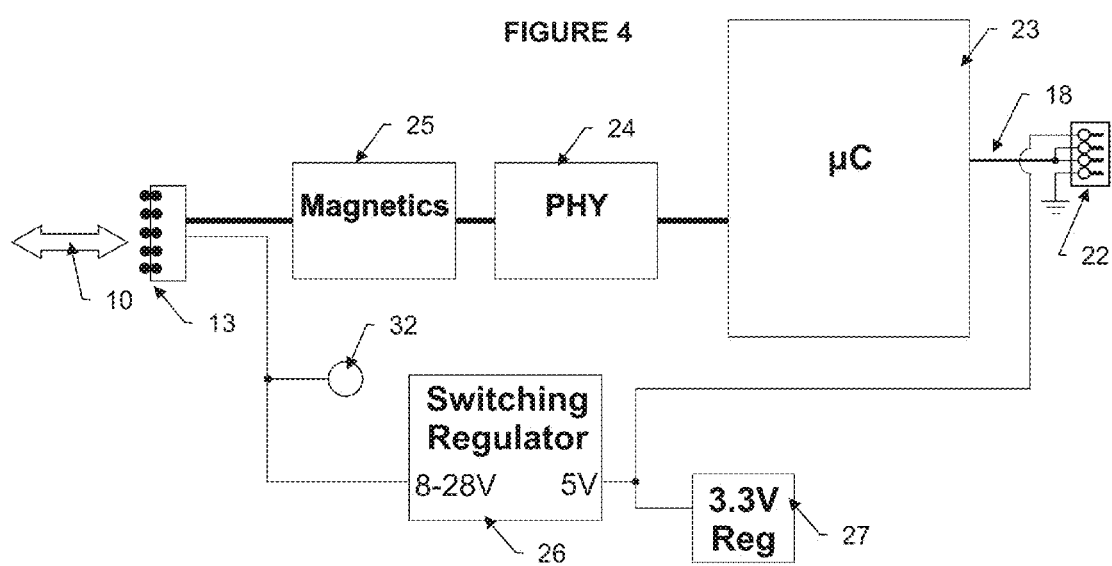
FIG. 4 is a diagram of a central controller 3 using standard Ethernet for connection to a SCADA system.

Referring now to FIG. 4 of the drawings, a block diagram is presented for illustration of the method and apparatus of one of the preferred embodiments of the central controller 3 in which connecter 13 carries standard Ethernet bus 10 through appropriate magnetics 25 and a PHY 24 to the central micro-computer 23. Power over Ethernet from connecter 13 is conditioned and reduced to 5V by the regulator 26, then further conditioned and reduced to 3.3V by regulator 27 which supplies all of the circuity on the central controller 3. The 5V from regulator 26 is connected to the internal bus 18. Internal bus 18 is also connected to the micro-computer 23 and to ground. Connector 22 is included to allow the connection of a plurality of input/output circuits 2. A connection 32 is made available to allow connection of the raw power (8-28 VDC) 32 to the input/output circuits 2 to power any sensors that require it.

Figure 5:
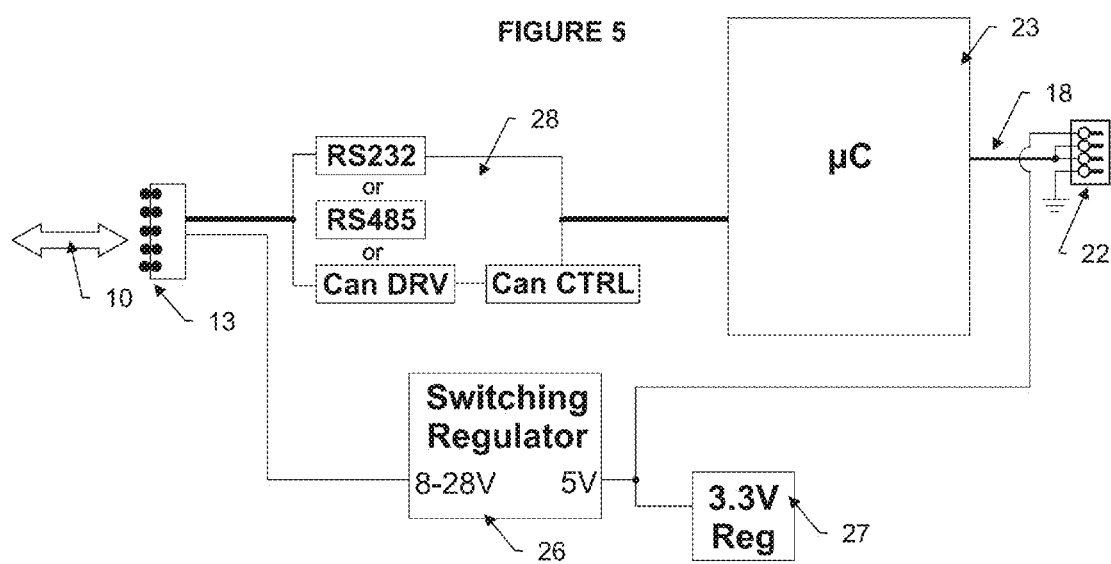
FIG. 5 is a diagram of a central controller 3 using other standard busses for connection to a SCADA system.

Referring now to FIG. 5 of the drawings, a block diagram is presented for illustration of the method and apparatus of one of the preferred embodiments of the central controller 3 in which connecter 13 carries other standard busses to the central micro-computer 23. One or more communication bus interfaces 28 are provided and may include other standard buses such as MOD bus. Power is provided separately from connecter 13 is conditioned and reduced to 5V by the regulator 26, then further conditioned and reduced to 3.3V by regulator 27 which supplies all of the circuity on the central controller 3. The 5V from regulator 26 is connected to the internal bus 18. Internal bus 18 is also connected to the micro-computer 23 and to ground. Connector 22 is included to allow the connection of a plurality of input/output circuits 2. A connection 32 is made available to allow connection of the raw power (8-28 VDC) 32 to the input/output circuits 2 to power any sensors that require it.

Figure 6:
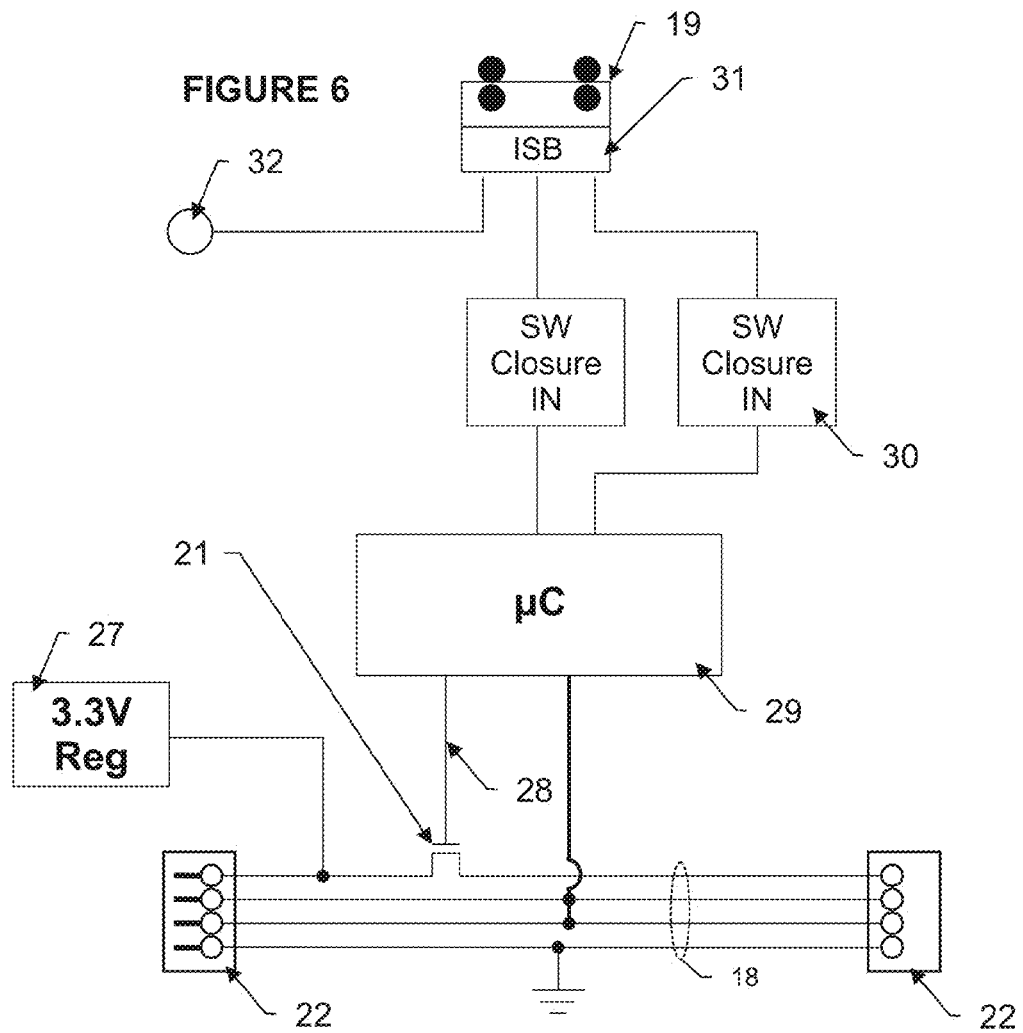
FIG. 6 is a diagram of a switch input type input/output circuit 2.

Referring now to FIG. 6 of the drawings, a block diagram is presented for illustration of the method and apparatus of one of the preferred embodiments of a switch input type input/output circuit 15 in which two connectors 22 are included to allow the connection of bus 18 through the module. Two signal bus lines 18 are also connected to micro-computer 29 and one to ground. The 5 Vdc Power line is connected to a 3.3 Vdc regulator 27 which powers the circuits on the module. The incoming side of the 5 Vdc Power line is also connected to one side of switch 21, the opposite side is passed to the next module via connector 22. Switch 21 is controlled by micro-processor 29 via control line 28, such that the next module is powered only after the current module has been addressed.

A plurality of signals from remote switch closure devices is passed through connector 19 then through Hazardous Intrinsic Safety Barrier (ISB) 31 to a plurality of switch closure conditioning and detection circuits 30. Detection circuits 30 are in turn connected to the micro-processor 29. Raw power (8-28 VDC) 32 may be connected to one of the outputs of connector 19 through ISB 31 to power any sensors that require it.

Figure 7:
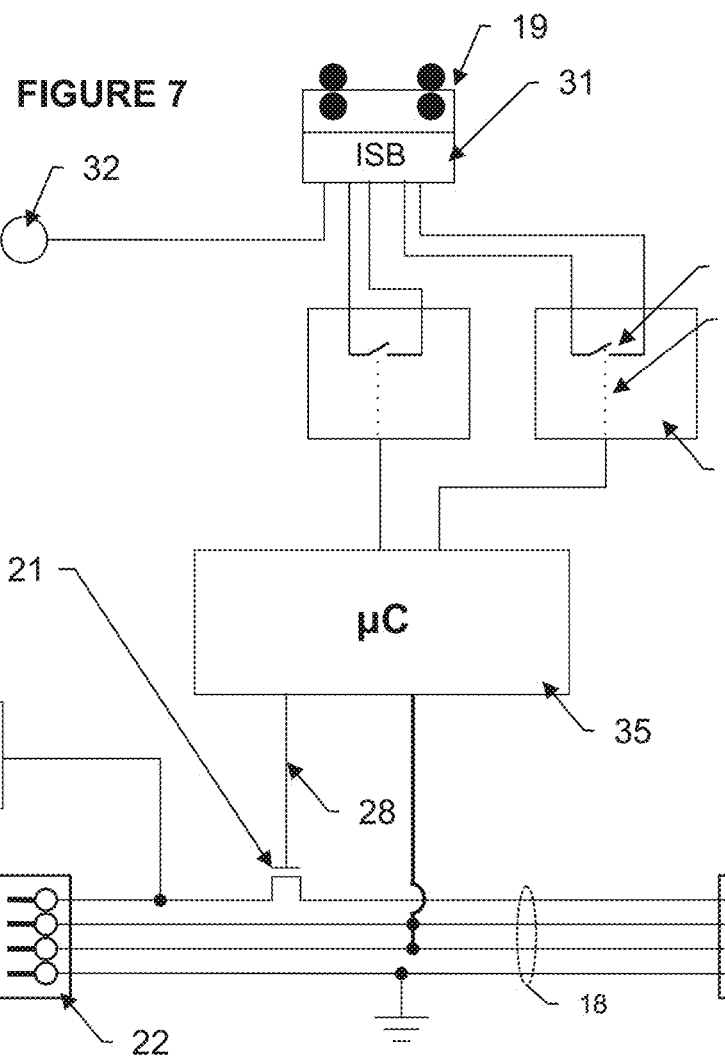
FIG. 7 is a diagram of a switch output type input/output circuit 2.

Referring now to FIG. 7 of the drawings, a block diagram is presented for illustration of the method and apparatus of one of the preferred embodiments of a switch output type input/output circuit 16 in which two connectors 22 are included to allow the connection of bus 18 through the module. Two signal bus lines 18 are also connected to micro-computer 35 and one to ground. The 5 Vdc Power line is connected to a 3.3 Vdc regulator 27 which powers the circuits on the module. The incoming side of the 5 Vdc Power line is also connected to one side of switch 21, the opposite side is passed to the next module via connector 22. Switch 21 is controlled by micro-processor 29 via control line 28, such that the next module is powered only after the current module has been addressed.

A plurality of signals to remote switch closure controlled devices is passed out through connector 19 from Hazardous Intrinsic Safety Barrier (ISB) 31 from a plurality of relay circuits 34. Relay circuits 34 consists of a plurality of contacts which are connected to connector 19 through ISB 31. The plurality of relay circuits 34 are controlled via control line 33 by the micro-processor 35. Raw power (8-28

VDC) 32 may be connected to one of the outputs of connector 19 through ISB 31 to power any sensors that require it.

Figure 8:
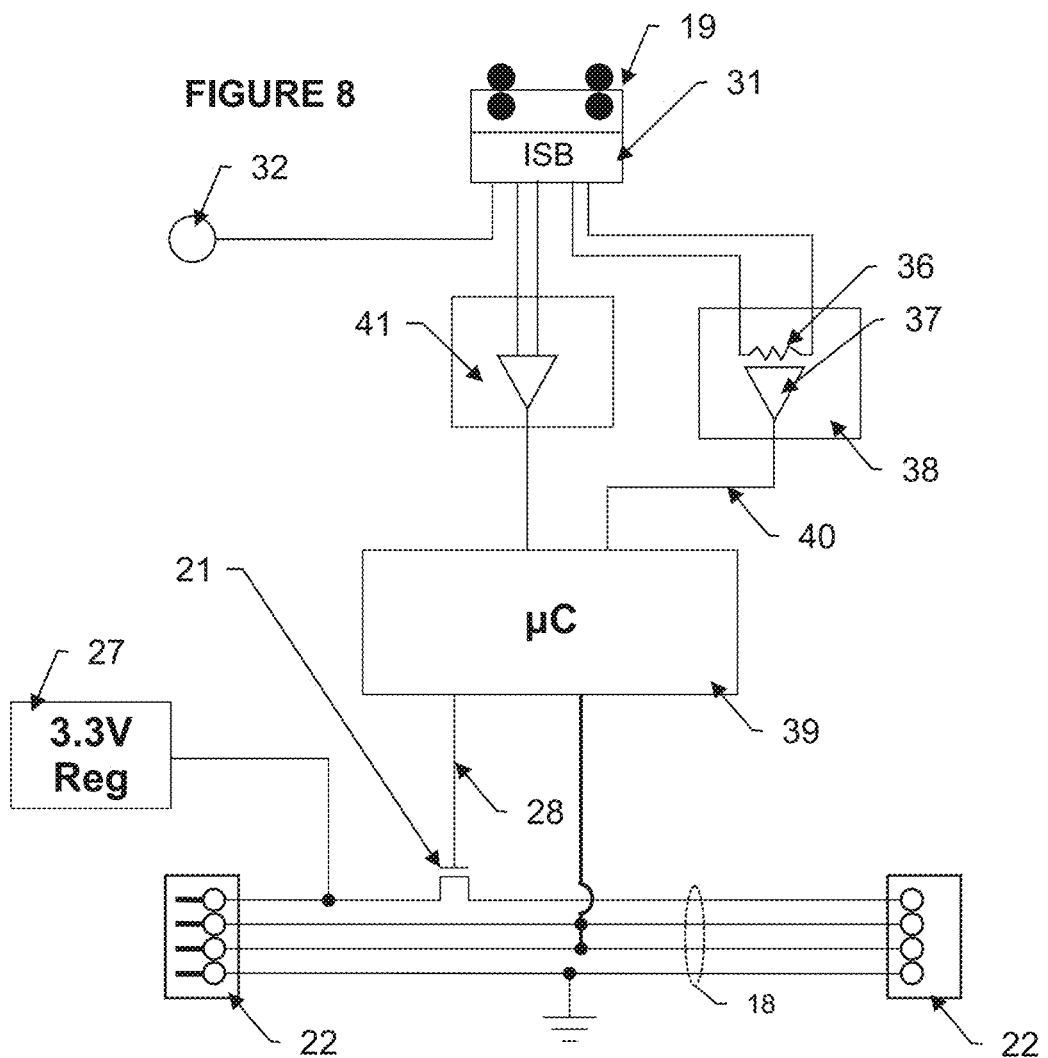
FIG. 8 is a diagram of an analog input type input/output circuit 2.

Referring now to FIG. 8 of the drawings, a block diagram is presented for illustration of the method and apparatus of one of the preferred embodiments of an analog input type input/output circuit 14 in which two connectors 22 are included to allow the connection of bus 18 through the module. Two signal bus lines 18 are also connected to micro-computer 39 and one to ground. The 5 Vdc Power line is connected to a 3.3 Vdc regulator 27 which powers the circuits on the module. The incoming side of the 5 Vdc Power line is also connected to one side of switch 21, the opposite side is passed to the next module via connector 22. Switch 21 is controlled by micro-processor 39 via control line 28, such that the next module is powered only after the current module has been addressed.

A plurality of signals from remote analog output devices is passed in through connector 19 then through Hazardous Intrinsic Safety Barrier (ISB) 31 to a plurality of analog conditioning circuits 34. Relay circuits 38 consists of a plurality of current to voltage converters 36 which are connected to connector 19 through ISB 31. The plurality of current to voltage converters 36 could be not included if voltage input is required 41. The plurality of current to voltage converters 36 is connected to a plurality of voltage conditioners 37 which are in turn connected via control line 40 to the micro-processor 39. Analog to digital converters in the micro-computer 39 measures said voltage. Raw power (8-28 VDC) 32 may be connected to one of the outputs of connector 19 through ISB 31 to power any sensors that require it.

Referring now to FIG. 9 of the drawings, a block diagram is presented for illustration of the method and apparatus of one of the preferred embodiments of an analog output type input/output circuit 17 in which two connectors 22 are included to allow the connection of bus 18 through the module. Two signal bus lines 18 are also connected to micro-computer 43 and one to ground. The 5 Vdc Power line is connected to a 3.3 Vdc regulator 27 which powers the circuits on the module. The incoming side of the 5 Vdc Power line is also connected to one side of switch 21, the opposite side is passed to the next module via connector 22. Switch 21 is controlled by micro-processor 43 via control line 28, such that the next module is powered only after the current module has been addressed.

A plurality of signals to remote analog control devices is passed out through connector 19 from Hazardous Intrinsic Safety Barrier (ISB) 31. A plurality of analog conditioning circuits 44 are provided which consist of a plurality of voltage to current converters 46 which are connected to connector 19 through ISB 31. The plurality of voltage to current converters 46 could be not included if voltage output 47 is required. The plurality of current to voltage converters 46 is connected to a plurality of voltage conditioners 45 which are in turn connected via control line 42 to the micro-processor 43. Digital to analog converters in the micro-computer 43 converts set points from bus 18 to said voltage. Raw power (8-28 VDC) 32 may be connected to one of the outputs of connector 19 through ISB 31 to power any sensors that require it.

Referring now to FIG. 10 of the drawings, a shadow view is presented for illustration of the apparatus of one of the preferred embodiments of the rugged remote input/output module 1 including a plurality of input/output circuits 2 and a central controller 3. The plurality of input/output circuits 2 are connected via connectors 22 through an internal bus 18 to a central controller 3. The central controller 3 includes a connecter 13 allowing connection to standard bus 10. Status LED's 49 are provided on each input/output circuits 2. The entirety is fully encapsulated with poly-urethane 20 or other suitable compound. Mounting holes 48 through the encapsulation are provided for filed installation.

The Rugged Remote Input/Output Module of the present invention can be used in numerous industries Where there is consideration of ruggedness, water resistance and/or ignition in locations made hazardous by the presence of flammable or combustible materials under normal atmospheric conditions. Such industries include printing presses, chemical processing, oil and gas drilling and production, transport, mining, explosive manufacturing, etc.

Although the invention has been described in connection with preferred embodiments, it should be understood that various modifications, additions and alterations may be made to the invention by one skilled in the art without departing from the spirit and scope of the invention. All combinations and permutations of the above described features and embodiments may be utilized in conjunction with the invention.

What is claimed is:

1. An apparatus for interfacing a plurality of remote devices to a programmable logic controller (PLC), the apparatus comprising:
   a plurality of input/output circuits, each of the input/output circuits having a connector for coupling to a particular one of the remote devices;
   a central controller; and
   an internal bus to which each of the input/output circuits and the central controller are coupled;
   wherein each input/output circuit communicates with the central controller via the internal bus regarding state changes of the particular remote device coupled to that input/output circuit;
   the central controller communicates with the programmable logic controller (PLC) through a communication path different than the internal bus regarding state changes of all the remote devices;
   the input/output circuits are coupled to the internal bus in a series starting with a first input/output circuit and finishing with a last input/output circuit;
   a power line of the internal bus provides power to each of the input/output circuits;
   the apparatus includes a plurality of switches intermediate each of the input/output circuits through which the power line of the internal bus is daisy chained;
   at a start of an initialization phase, the switches are configured such that only the first input/output circuit has power turned on, and the central controller assigns a unique address to the first input/output circuit; and
   during the initialization phase, each of the switches are configured one by one such that only a next input/output circuit in the series has power turned on and the central controller then assigns a unique address to the next input/output circuit, the initialization phase continuing until the last input/output circuit has been assigned a unique address;
   whereby, after the initialization phase is finished, the central controller can individually send commands to and receive data from each input/output circuit via the internal bus.

2. The apparatus of claim 1, wherein the central controller is coupled to a central connector, the central connector allowing communication between the central controller and the programmable logic controller (PLC) through the communication path being a cable.

3. The apparatus of claim 2, wherein:
the central controller is physically positioned on a first end of the apparatus;
the internal bus runs along a line extending from the central controller toward a second end of the apparatus;
each of the input/output circuits are positioned along the internal bus between the first end and the second end;
the central connector extends from the first end of the apparatus and connects to the cable parallel to the line formed by the internal bus; and
a plurality of connectors formed by the connector of each of the input/output circuits are oriented to connected to the remote devices with cables perpendicular to the line formed by the internal bus.

4. The apparatus of claim 1, wherein the central controller transmits commands to a particular one of the input/output circuits in order to change a state of one of the remote devices in response to a command received from the programmable logic controller.

5. The apparatus of claim 1, wherein the central controller transmits state information of one of the remote devices to the programmable logic controller in response to receiving state change data from a particular one of the input/output circuits.

6. The apparatus of claim 1, wherein at least a particular one of the input/output circuits comprises:
a micro-processor coupled to the internal bus; and
an intrinsic safety barrier intermediate the connector of the particular one of the input/output circuits and the micro-processor.

7. The apparatus of claim 1, wherein at least a particular one of the input/output circuits comprises a connection to raw power coupled to an output of the connector of the particular one of the input/output circuits.

8. The apparatus of claim 1, further comprising one or more status light emitting diodes (LEDs) on each input/output circuit.

9. The apparatus of claim 1, being encapsulated in a solid block of poly-urethane.

10. The apparatus of claim 9, further comprising mounting holes through the solid block of poly-urethane.

11. The apparatus of claim 1, further comprising a radio coupled to the central controller, the radio allowing communications between the central controller and the programmable logic controller (PLC) through the communication path being wireless signals.

12. The apparatus of claim 1, wherein the programmable logic controller (PLC) is part of a supervisory control and data acquisition (SCADA) system.

13. A method of interfacing a plurality of remote devices to a programmable logic controller (PLC), the method comprising:
providing a plurality of input/output circuits, each of the input/output circuits having a connector for coupling to a particular one of the remote devices;
providing a central controller for communicating with the programmable logic controller (PLC);
providing an internal bus to which each of the input/output circuits and the central controller are coupled;
communicating by each input/output circuit with the central controller via the internal bus regarding state changes of the particular remote device coupled to that input/output circuit;
communicating by the central controller with the programmable logic controller (PLC) through a communication path different than the internal bus regarding state changes of all the remote devices;
coupling the input/output circuits to the internal bus in a series starting with a first input/output circuit and finishing with a last input/output circuit;
providing a power line of the internal bus for powering the input/output circuits;
providing a plurality of switches intermediate each of the input/output circuits through which the power line of the internal bus is daisy chained;
at a start of an initialization phase, configuring the switches such that only the first input/output circuit has power turned on;
while only the first input/output circuit has power turned on, assigning by the central controller a unique address to the first input/output circuit;
during the initialization phase, configuring each of the switches one by one such that only a next input/output circuit in the series has power turned on;
while only a particular input/output circuit has power turned on, assigning by the central controller a unique address to the particular input/output circuit;
continuing the initialization phase until the last input/output circuit has been assigned a unique address; and
after the initialization phase is finished, individually sending commands to and/or receiving data from each input/output circuit by the central controller via the internal bus.

14. The method of claim 13, further comprising communicating between the central controller and the programmable logic controller (PLC) through the communication path being a cable.

15. The method of claim 13, further comprising transmitting commands to a particular one of the input/output circuits by the central controller in order to change a state of one of the remote devices in response to a command received from the programmable logic controller.

16. The method of claim 13, further comprising transmitting state information of one of the remote devices by the central controller to the programmable logic controller in response to receiving state change data from a particular one of the input/output circuits.

17. The method of claim 13, further comprising connecting raw power to an output of the connector of at least a particular one of the input/output circuits.

18. The method of claim 13, further comprising encapsulating an apparatus including the input/output circuits, the central controller, and the internal bus within a solid block of poly-urethane.

19. The method of claim 13, further comprising communicating between the central controller and the programmable logic controller (PLC) through the communication path being wireless signals.

20. The method of claim 13, wherein the programmable logic controller (PLC) is part of a supervisory control and data acquisition (SCADA) system.

* * * * *